INVENTOR.
CHARLES E. ELLIS

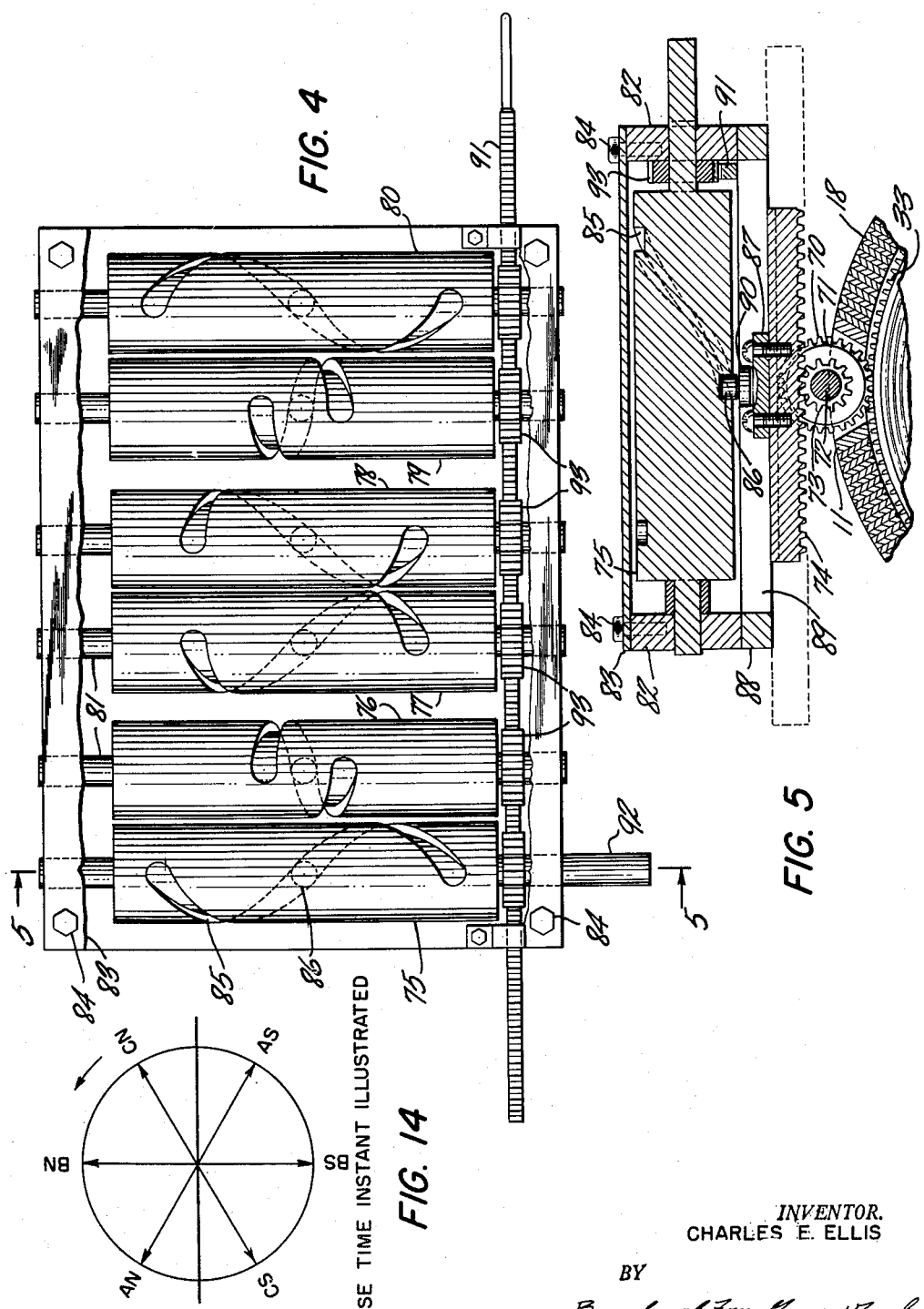

Jan. 16, 1962     C. E. ELLIS     3,017,528
ADJUSTABLE SPEED ALTERNATING CURRENT MOTOR
Filed April 9, 1959     9 Sheets-Sheet 5
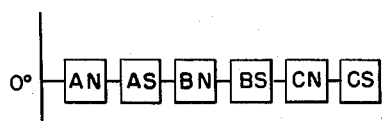
FIG. 6
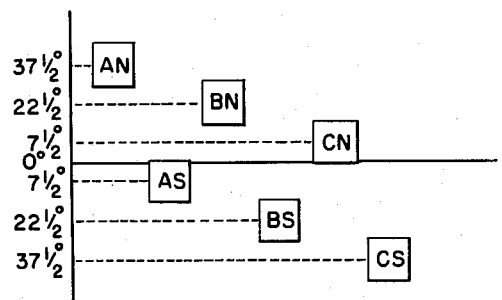
FIG. 7
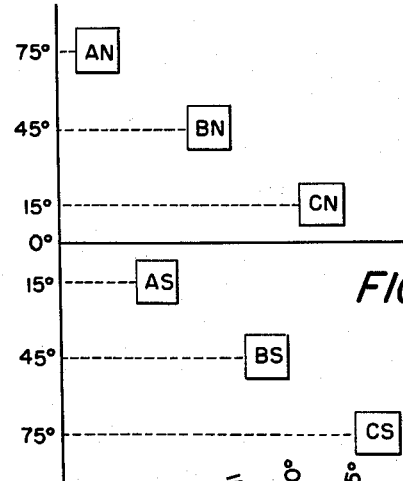
FIG. 8
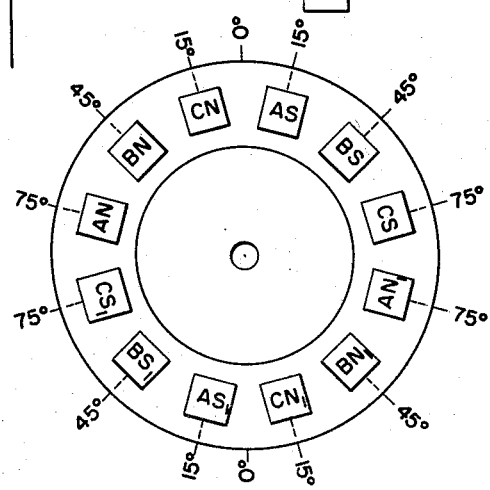
FIG. 10
FIG. 9
INVENTOR.
CHARLES E. ELLIS
BY
his     ATTORNEYS Jan. 16, 1962      C. E. ELLIS      3,017,528
ADJUSTABLE SPEED ALTERNATING CURRENT MOTOR
Filed April 9, 1959      9 Sheets-Sheet 9

INVENTOR.
CHARLES E. ELLIS
BY
his    ATTORNEYS

United States Patent Office 3,017,528
Patented Jan. 16, 1962

3,017,528
ADJUSTABLE SPEED ALTERNATING
CURRENT MOTOR
Charles E. Ellis, 40 Armour Road, Mahwah, N.J.
Filed Apr. 9, 1959, Ser. No. 805,335
16 Claims. (Cl. 310—191)

This invention relates to alternating current dynamo electric machinery. More specifically, it has to do with new and improved adjustable pole pitch dynamo electric machinery that can be operated as a highly effective adjustable speed polyphase motor.

It has been proposed heretofore to provide an adjustable speed alternating current motor having means for adjusting the pitch between the several poles of the motor. My Patent No. 2,675,494, patented April 13, 1954, for example, discloses an adjustable speed motor having axially extending rows of poles provided at different positions around the rotor and means for skewing each of the poles around the rotor to adjust the pole pitch and thus vary the speed of the motor.

Motors of this type have the disadvantage that they tend to be larger than conventional alternating current motors of equal power rating. This is due in part to the reduced efficiency of conventional adjustable speed motors which results from the fact that, at less than maximum speed and full skew, the poles of opposite polarity in adjacent phase groups have leakage paths between them.

Another reason for the excess weight and size of these motors is the fact that axial stator and rotor laminations are required because the magnetic flux travels in an axial as well as in a radial direction, and the axial laminations have to carry the resultant flux of all three phases at their center portions. The resultant flux of the three phase poles is one and one-half times the instantaneous value of any single phase pole and, therefore, the rotor and stator axial laminations have to be 50% larger in cross-section at their center portions if the same magnetic flux density per unit area is to be maintained.

Accordingly, it is the purpose of the present invention to provide an alternating current dynamo electric apparatus capable of effective operation as an adjustable speed motor which is of approximately the same size and weight as a conventional alternating current motor of the same power rating.

This is accomplished by providing, in one embodiment of the invention, a stator which includes a plurality of magnetic poles, a rotor mounted adjacent to the stator and spaced from the poles by a relatively narrow air gap, and means to adjust the positions of the poles relative to the rotor in order to permit adjustment of the pole pitch and the distance between adjacent median points between the poles of each phase, called the median pitch, over a range wide enough to secure the range of speed control desired. The north and south magnetic poles of each phase are disposed adjacent one another and form, in a three phase motor, three spearate cells. Each pair of poles, or phase cell, is provided with separate rotor and stator, axial and radial, magnetic laminations, and each cell is separated from the other cells by nonmagnetic spacers so that the magnetic flux built up by each pair of phase poles follows a separate and independent magnetic path.

As a result of the separate and independent magnetic paths, no major part of either the rotor or the stator has to carry a greater quantity of magnetic flux than any other major part. Furthermore, the leakage is reduced at less than full skew between the poles of opposite polarity in adjacent phase cells. These and other factors combine to increase the efficiency of the motor and at the same time to decrease the size to the point where a commercially valuable adjustable speed alternating current motor can be built.

The invention may be better understood from the following detailed description taken in conjunction with the accompanying figures of the drawings, in which:

FIG. 4 is an illustration of another form of means for varying the pitch of the magnetic poles with respect to each other and the rotor;

FIG. 5 is a view in section taken along the line 5—5 of FIG. 4;

Figure 11:
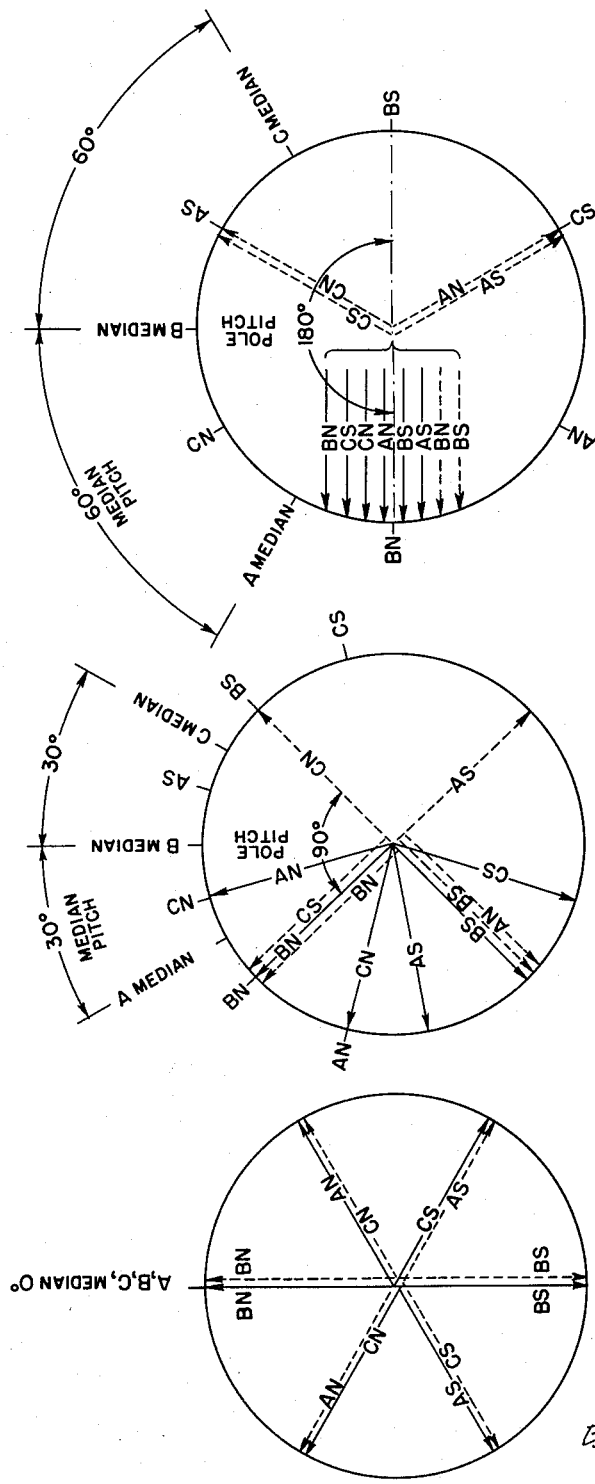
Figure 12:
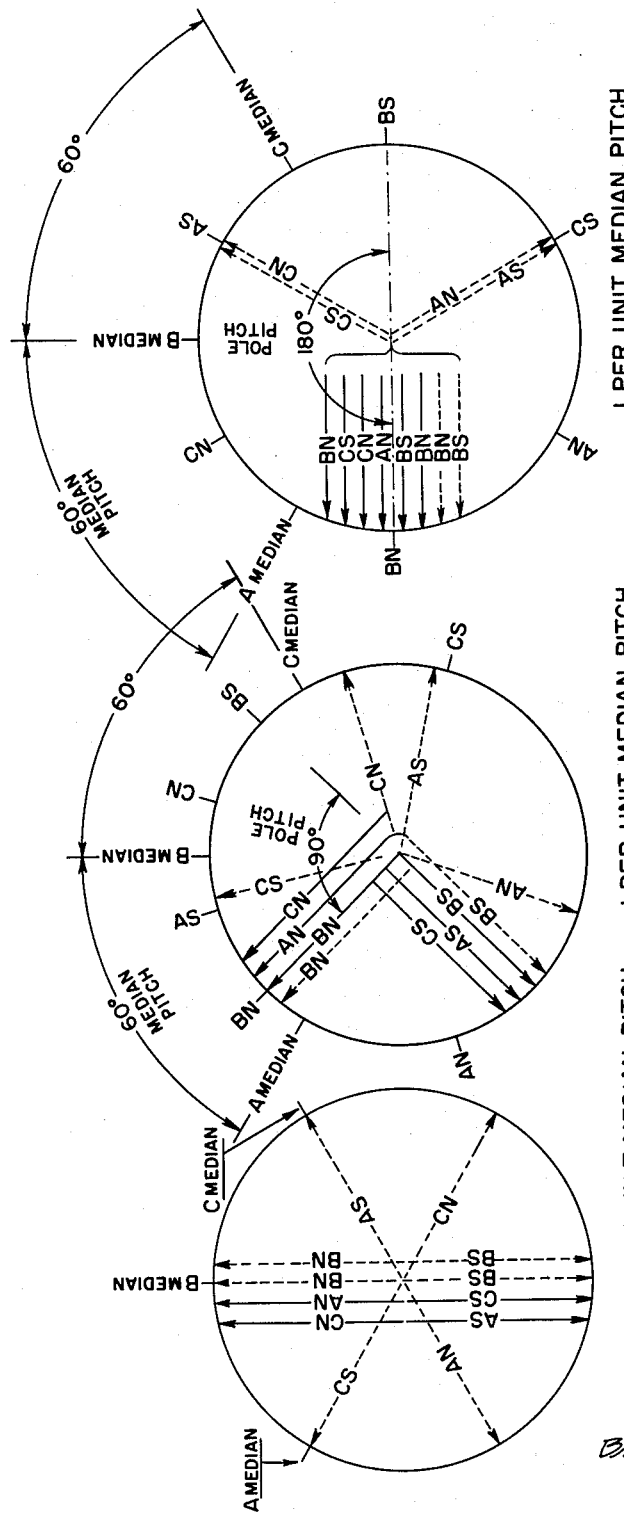
Figure 13:
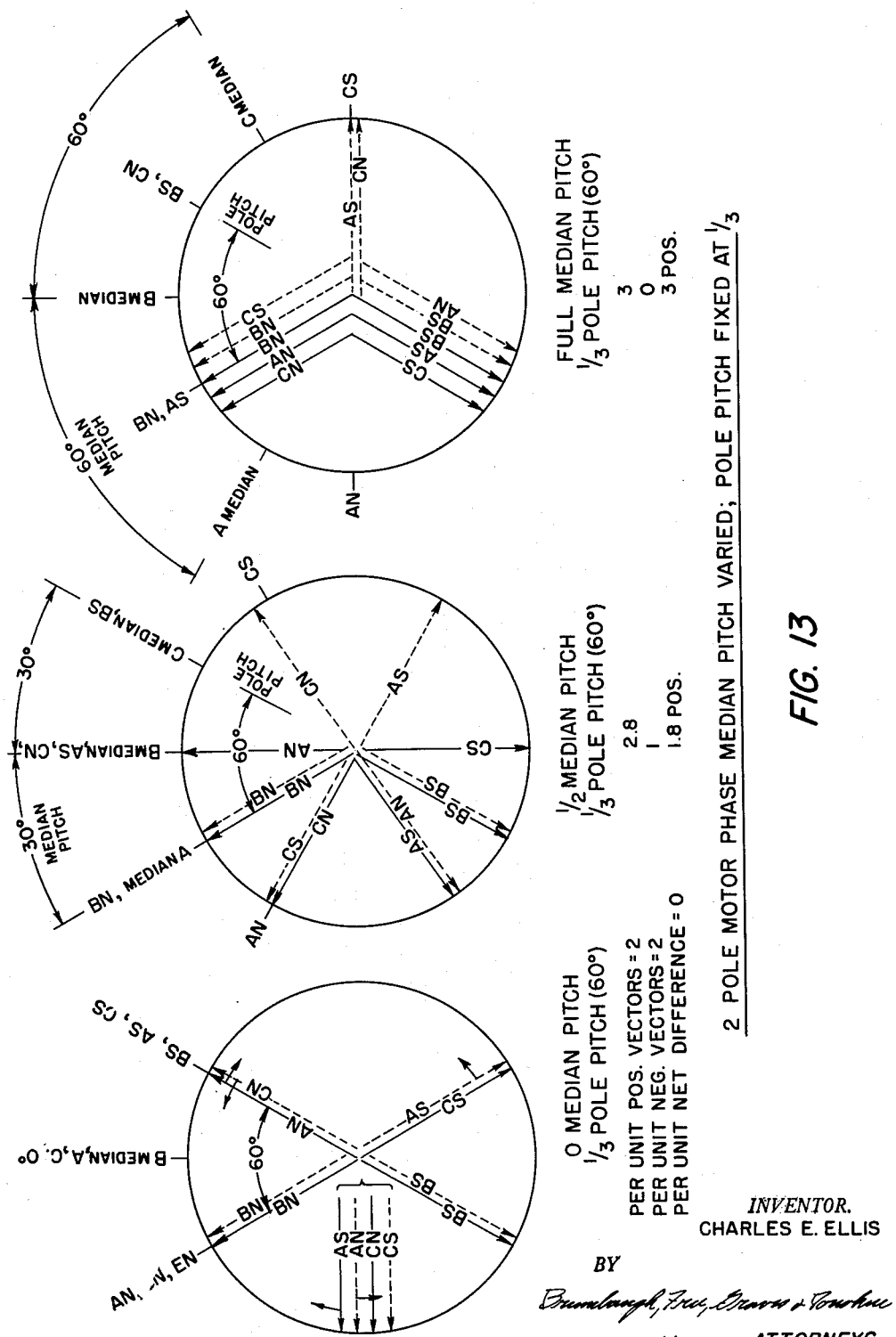
Figure 15:
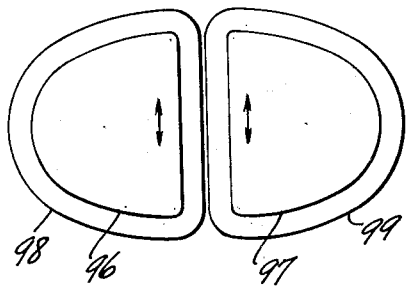
Figure 16:
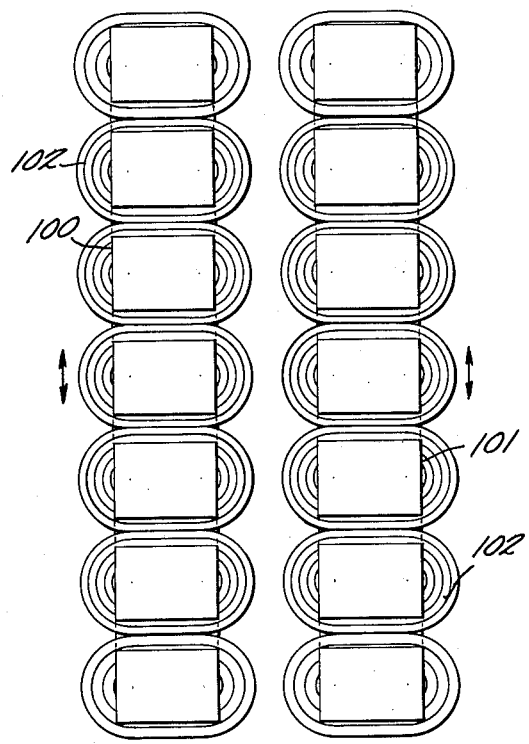

FIGS. 6–9, inclusive, illustrate schematically a typical program of pole skew for a three phase, four-pole induction motor;

FIG. 10 is a schematic diagram of typical stator winding connections for one phase of a three phase, four-pole induction motor according to the invention;

FIG. 11 is a vectorial illustration of the magnetic field relations obtaining in a three phase, two-pole induction motor as the phase median and the pole pitch are varied in equal proportions;

FIG. 12 is a vectorial illustration of the resultant magnetic field relations in a three phase, two-pole induction motor as the pole pitch is varied for a fixed position of the phase median;

FIG. 13 is a vectorial illustration of the magnetic field relations in a three phase, two-pole induction motor as the phase median is varied, the pole pitch being fixed;

FIG. 14 illustrates the current phase time instant assumed in the vector diagrams of FIGS. 11–13;

FIGS. 15 and 16 illustrate alternative forms of pole faces and windings; and

Figure 17:
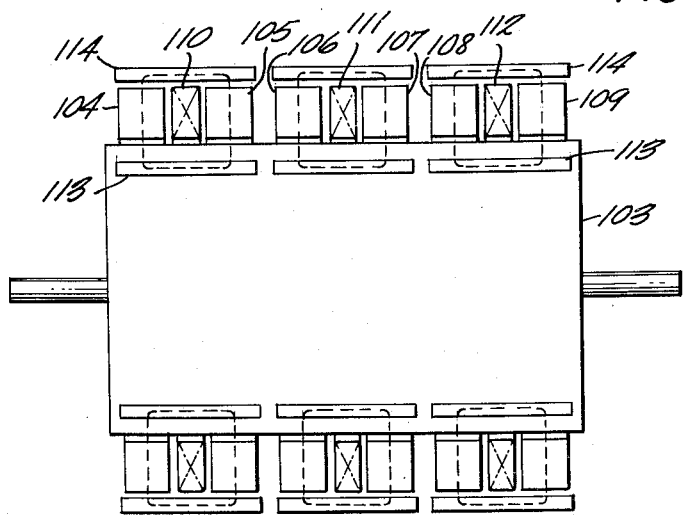

FIG. 17 illustrates a further method of inductively coupling the stator windings to the phase poles.

Figure 1:
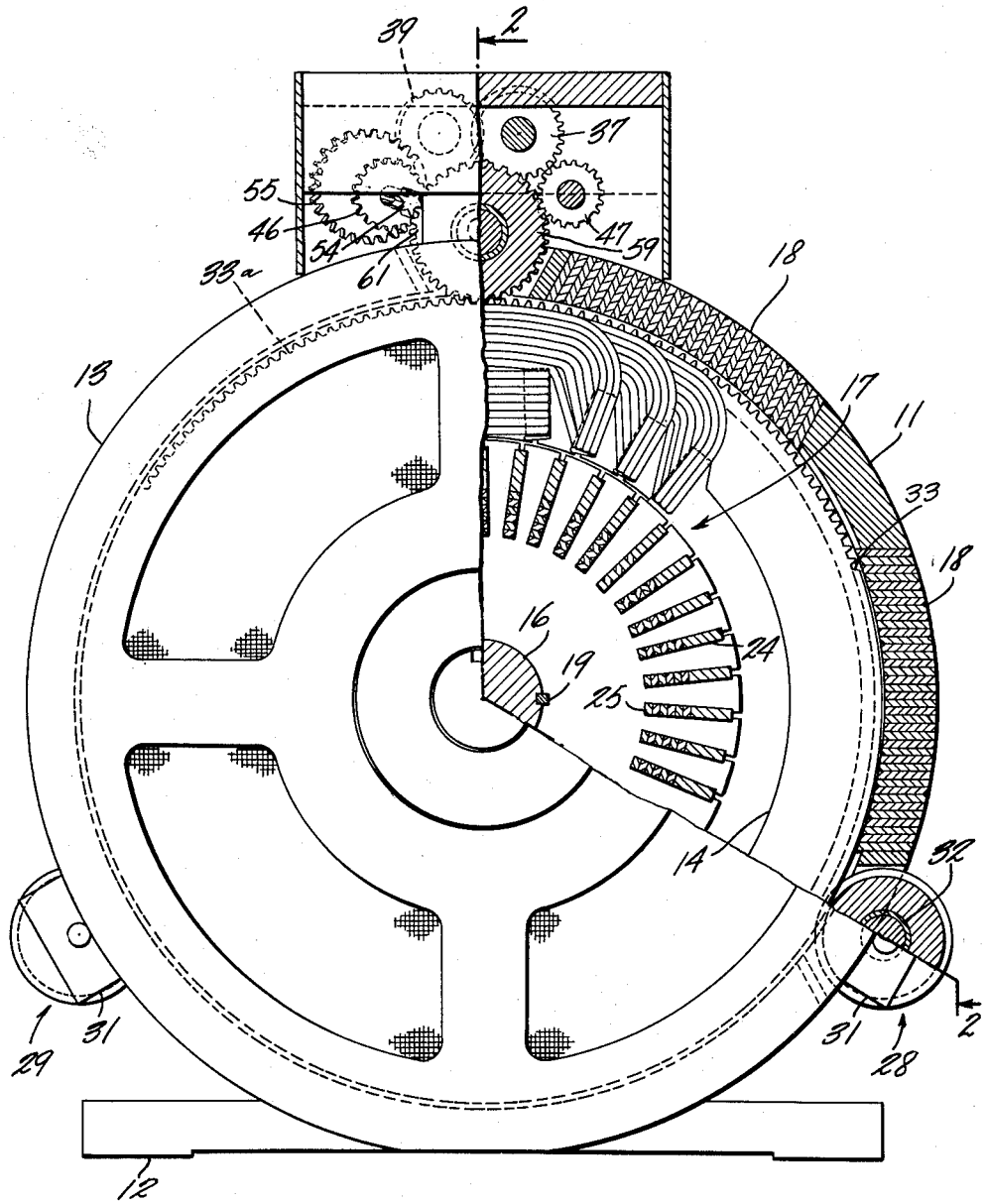
FIG. 1 is an end view partially in section of an adjustable speed alternating current motor constructed in accordance with the invention.
Figure 2:
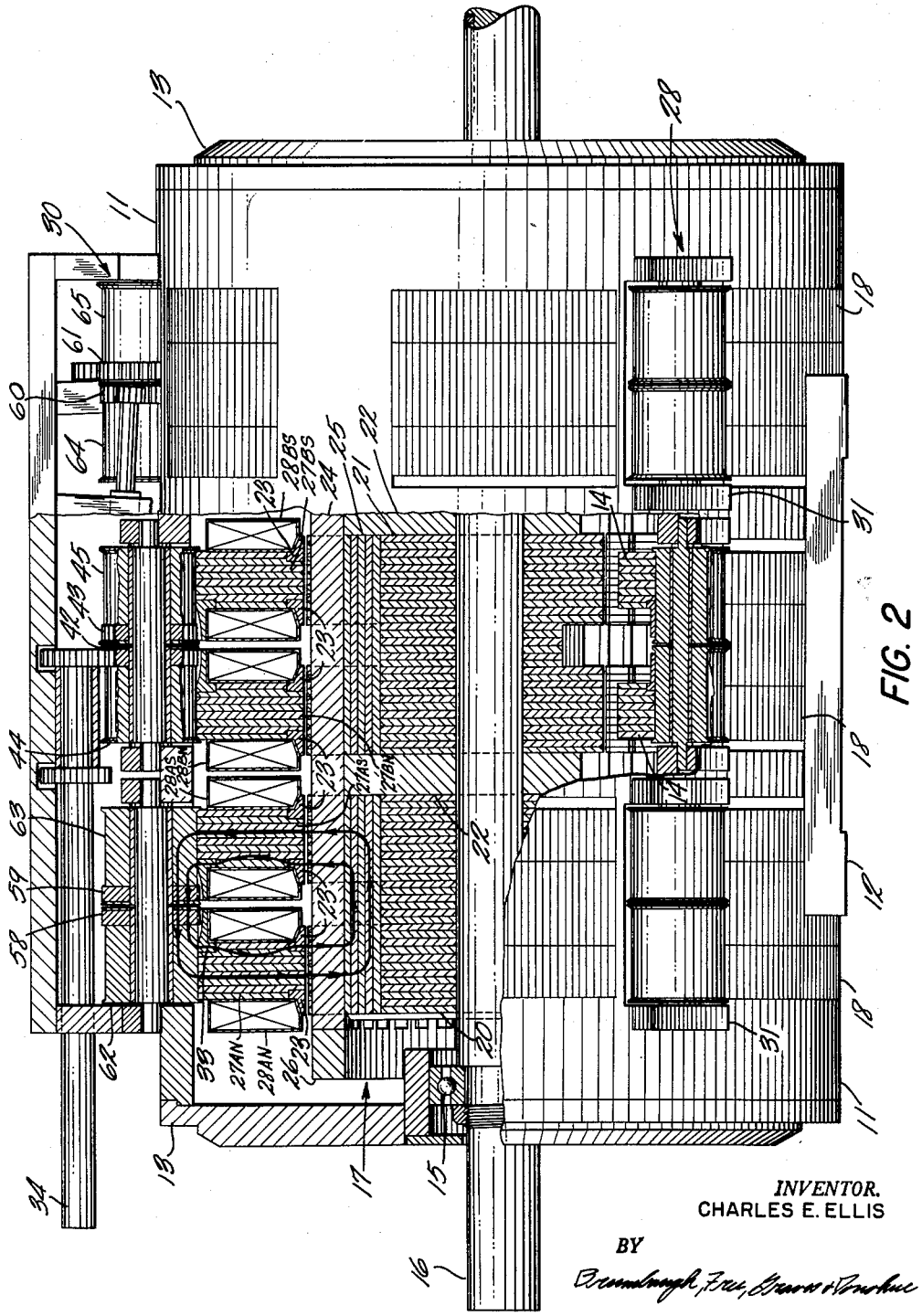
FIG. 2 is a view taken along line 2—2 of FIG. 1.

The structure shown in FIGS. 1 and 2 for purposes of illustration is that of a three-phase, four-pole induction motor including a nonmagnetic housing 11 mounted on a foot or pedestal 12. Three groups of six sets of axial stator magnetic laminations 18 are disposed in openings formed in the housing 11, each group being positioned over a pair of stator yokes as will be explained hereafter. Nonmagnetic end bells 13 close each end of the housing and support conventional bearings, such as bearing 15, in which a rotor shaft 16 is journaled. The end bells 13 and the housing 11 are preferably provided with conventional air intake ports for cooling purposes.

Mounted on the shaft 16 is a rotor 17 formed of radial rotor laminations secured to the shaft 16 by a key 19. The rotor laminations are sectioned in three groups, two of which are shown in FIG. 2 and numbered 20 and 21, and are separated by nonmagnetic spacers 22. The rotor has a plurality of axially extending slots, similar to those in a conventional squirrel-cage motor, into which are inserted insulated conductor bars 24 which extend the length of the rotor and are joined at each end by end rings 26. Beneath each of the conductor bars are axially extending magnetic laminations 25 which are also divided into three groups by the nonmagnetic spacers 22.

The stator is made up of six stator yokes 14 mounted in rotatable fashion in the housing 11. Each stator yoke 14 is constructed of a group of ring-like magnetic laminations having two inwardly extending diametrically opposed phase poles separated from the rotor 17 by a small air gap.

The phase poles 27AN, 27AS, 27BN, 27BS, 27CN and 27CS, portions of which are shown in FIG. 2, extend across the top of the stator and the phase poles $27AN_1$, $27AS_1$, $27BN_1$, $27BS_1$, $27CN_1$ and $27CS_1$ extend across the bottom. The upper poles are provided with windings 28AN, 28AS, 28BN, 28BS, 28CN and 28CS and the lower poles with windings $28AN_1$, $28AS_1$, $28BN_1$, $28BS_1$, $28CN_1$ and $28CS_1$. In the system of notation used, A, B and C refer to the phases of a three phase source and N and S refer to the north and south mganetic poles, respectively. The connection of the windings of phase A is illustrated in FIG. 10 in which the windings 28AN and $28AN_1$ are inductively coupled to the poles 27AN and $27AN_1$ on the opposite sides of the same yoke and the oppositely wound windings 28AS and $28AS_1$ are inductively coupled to the poles 27AS and $27AS_1$ on the opposite sides of the adjacent yoke. The four windings shown in each group are concentric windings for each salient pole. Phases B and C are similarly connected to windings on the remaining pairs of poles.

As is best shown in FIG. 1, each salient pole face may be constructed in a conventional manner with teeth and slots which carry concentric windings adapted to produce a magnetic pole of graduated intensity, with maximum intensity at the center and dropping off in intensity towards the ends of a pole. The effect is to produce a step sine wave that is stationary in space but which varies in intensity with the amplitude of a phase of the alternating current supply. Two axially extending ears 23, made of a magnetic material, are fastened to each pole tooth for the dual purpose of supporting the windings and providing a larger air gap area without increasing the length of the rotor, since these ears do not project beyond the outline of the windings adjacent to them.

The six stator yokes 14 are supported by two groups of six idler rollers 28 and 29 (FIG. 1) and one group of six drive rollers 30. The idler rollers are mounted in pairs on common shafts but are mounted so that they can rotate separately. The shafts are eccentrically journaled in support blocks 31 so that the positions of the rollers, and of the yokes resting on them, can be varied through a small range of approximately a few thousandths of an inch. An antifriction bushing 32 may be provided for each roller if desired. Each idler roller has a flange on each side so that the stator yoke resting on it will be maintained in the proper position.

The group of six drive rollers 30 serve to skew the poles about the rotor. For this purpose, ring gears 58, 59, 42, 43, 60 and 61 (FIG. 2) are fixedly attached to the rollers and mesh with teeth, formed in $33a$, respectively, formed in annular ears 33, respectively, fastened to the yokes, and extending over an arc equal to the distance through which the yokes are to be rotated.

Figure 3:
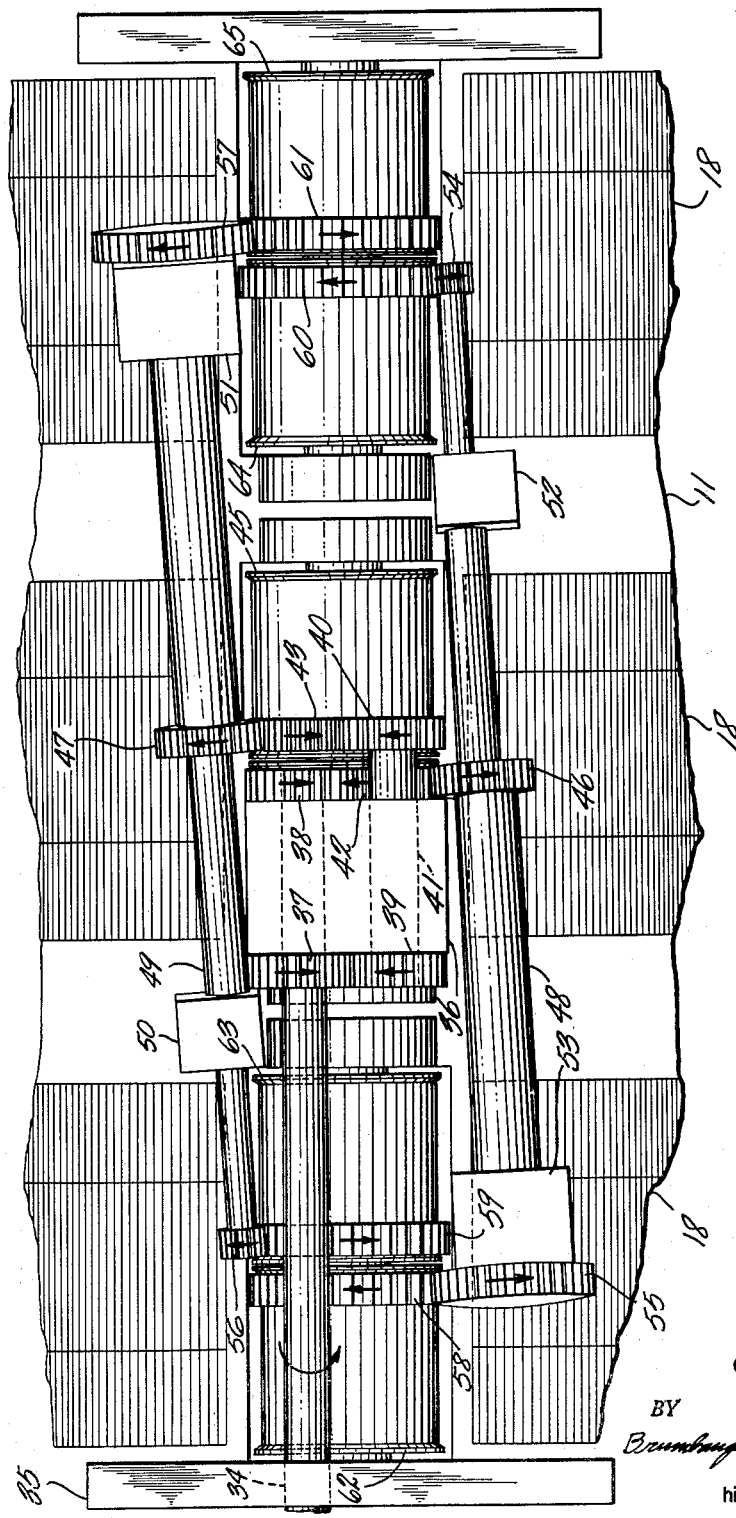
FIG. 3 is an illustration of one means that may be employed to vary the pitch of the magnetic poles with respect to each other and the rotor.

A gear train adapted to rotate the drive rollers 30, and thereby rotate the stator yokes, is illustrated in FIG. 3. It comprises a control shaft 34, supported by an end support block 35 and a support block 36, which drives two gears 37 and 38. The gear 37 drives a gear 39 which is connected to a gear 40 by a shaft 41. The gears 38 and 40 drive the gears 42 and 43, respectively, which are fastened to the rollers 44 and 45, respectively, and drive two bevel gears 46 and 47. The gears 46 and 47 drive the shafts 48 and 49, respectively, which are journaled in support blocks 50, 51 and 52, 53, respectively, and drive four bevel gears 54, 55, 56 and 57 which mesh with the gears 60, 58, 59 and 61, respectively. In a typical embodiment, the gears 37–40, 46 and 47 may have eighteen teeth each; the gears 42, 43 and 58–61 have thirty-six teeth each; the gears 54 and 56 have six teeth each; and the gears 55 and 57 have 30 teeth each.

It can be seen that when the control shaft 34 is rotated, the pitch of each pair of poles and the median line between the poles of each pair will be varied. Since the gears 58, 59, 42, 43, 60 and 61 which are attached to the respective drive rollers comprising the group 30 have the same number of teeth, the yokes they drive will be rotated an amount proportional to the number of teeth in the bevel gears 54, 46, 55, 56, 47 and 57, respectively. The gears 54, 46 and 55 have six, eighteen and thirty teeth, respectively, and are adapted to rotate the gears 60, 42 and 58 in a first direction through angles which, in a typical program, may vary according to the ratios 1:3:5. Likewise, the gears 56, 47 and 57 will rotate the gears 59, 43 and 61, respectively, according to the same ratios but in an opposite direction. This program is illustrated schematically in FIGS. 6–9.

FIG. 6 shows the positions of the six poles making up the top group at zero skew or, in other words, the minimum speed position for the motor. Since the poles are lined up axially, the flux built up by any pair of phase poles, such as the poles AN and AS, for example, will follow an axial path that does not link any of the rotor conductor bars so that no current is induced in the rotor. FIG. 7 shows the positions of the poles after the control shaft 34 had been rotated until the poles are in the one-half skew or one-half maximum speed position and FIGS. 8 and 9 show the poles at maximum skew or the maximum speed position. It will be noted from these figures that phase poles AN and CS rotate in a direction opposite to their companion poles AS and CN and always rotate five times as far in a radial direction. Phase poles BN and BS also rotate in opposite directions but in equal amounts. It can be seen that as the control shaft is rotated toward the maximum speed position, the phase poles are skewed in such a manner that a line drawn through the median points between the pole pairs will be a helix with an increasing angle. Other programs of skew to be described later will also produce this helical pattern.

In operation, current from a three phase supply flowing through the pole windings creates a magnetic flux in three independent magnetic circuits for each pole position around the stator, one of which is illustrated in FIG. 2. The flux leaves the face of phase pole 27AN, passes through the air gap and enters the teeth of the rotor 17, passes through the axial rotor laminations 25, goes back through the air gap to the phase pole 27AS, passes through the axial stator laminations 18 and returns to the pole 27AN. If the phase poles are skewed, as shown in FIGS. 7–9, the flux also travels radially through the radial rotor laminations and the yoke laminations, thereby linking a portion of the rotor conductor bars and causing current to flow in them. Since the median points of the pole pairs are arranged in a helical pattern, a wave of flux density will travel around the rotor and will exert a tangential force on the current carrying rotor conductor bars, causing the rotor to rotate at a speed dependent upon the angle of the helix.

FIGS. 4 and 5 illustrate an alternative apparatus for skewing the phase poles. Since the structure for each yoke is substantially the same, it will be necessary to describe only one in detail. As previously described, the ring-like yokes are rotatably mounted inside a housing 11 which is equipped with axial stator laminations 18. Teeth formed in an annular ear 33 on each yoke mesh with a ring gear 70 which is attached to a drive roller 71. The drive roller 71 is made up of two cylindrical sections, each mounted on a supporting shaft 72, with a pinion 73 between the two sections. The gear 73 is enmeshed with a rack 74 which, when moved horizontally to the left or right as seen in FIG. 5, will drive the gears 73, 70 and 33 and cause the yoke to rotate.

Six barrel cams 75–80, one for each pole yoke, are mounted on top of the housing for the purpose of driving the racks. Since the cams are generally similar, it will be necessary to describe only one in detail. The cam 75 is mounted on a shaft 81 journaled in two side plates 82 which are attached to a cover plate 83 in any suitable manner as by bolts 84. The cam 75 has a slot 85 milled or otherwise formed in its outer surface which receives a follower roller 86. The follower roller 86 is part of a member 87 that is secured to the rack 74. A guide plate 88 is fastened to the two side plates 82 and has a slot 89 adapted to receive the member 87. A guide roller 90 is attached to the member 87 to keep it centered in the slot and the upper surface of the rack 74 rests against the underside of the guide plate 89 to keep the rack in a horizontal position.

The barrel cams 75–80 may be rotated to skew the poles by translating a rack 91 to the left or right in FIG. 1, to rotate the gearing 93 on the shafts 81 and 92. Alternatively, the cams may be rotated by turning the shaft 92.

The slots 85 in the cams are designed so that the yokes will be rotated the proper amount in the desired direction when the cams are rotated. The program shown in FIG. 4, for example, will produce the same 1:3:5 ratio of movement obtained with the gear train shown in FIG. 3, but it should be understood that any other program could be obtained with appropriate design of the cams and of the relationship between the various cams and the rack 91.

It is apparent that other means could be employed to secure relative movement of the yokes. Cables or chains, for example, could be used in place of the gear trains described.

FIGS. 11, 12 and 13 are vector studies of various programs of skew for operation of a polyphase two-pole motor that are helpful in understanding the invention, and FIG. 14 shows the phase time instant assumed for each study. A two-pole motor was chosen for simplicity of illustration and it is not intended that the invention should be limited thereto. The studies are made according to the double-revolving field theory which assumes the air gap flux built up by each phase pole may be resolved into two field components of equal strength revolving in opposite directions. By plotting the vectors and adding them up at various positions in each program, it is possible to determine the torque-speed characteristic for each program and to compare them.

FIG. 11 illustrates the magnetic field conditions prevailing in a two-pole motor as the position of the median line between each pair of poles and the pitch of each pair are both varied. At zero pitch, the six poles are lined up axially along the top of the motor. As shown in FIG. 14, when phase pole BN is at maximum amplitude, pole AN is decreasing in amplitude, pole CN is increasing in amplitude, etc. The phase positions are indicated by the two vectors for each pole, the solid line vector being assumed to rotate clockwise and the broken line vector being assumed to rotate counterclockwise; as can be seen, at zero pitch the vectors cancel each other out and there is zero resultant field and zero torque.

When the poles are skewed to the one-half pitch position, the median points between the A and C pole pairs are rotated 30° each, and the directions of the vectors are skewed by amounts equal to the pole skew. Addition of the positive and negative vectors gives a 2.55 net positive vector of field strength in this instance.

A similar procedure at full pitch shows that the negative rotating vectors cancel out completely and leave only the positive rotating vectors which add up to a per unit strength of six. This then is the position of maximum torque for this program.

In the program illustrated in FIG. 12, the distance between the median point of each pair of poles is fixed and the amount of skew of the poles is varied. It will be noted that the negative rotating vectors cancel out at each position leaving only the positive vectors. This program produces the same torque at full pitch as the program illustrated in FIG. 11 but this program has better torque characteristics at lower speeds.

In the program illustrated in FIG. 13, the pole pitch is fixed at one-third and the positions of the median points are varied. The asymmetrical arrangement of the poles gives poorer torque characteristics than the other programs and it is probably not as preferable for most purposes.

It can be seen that any number of programs can be set up by the proper design of the gear train shown in FIG. 3 or the cam arrangement shown in FIG. 4. By making a vector analysis of each program, as illustrated in FIGS. 11–13 or by some other method, the proper program can be selected for each application. It should be understood that the poles and median points do not have to be skewed by equal amounts or through the angles shown but the programs can be set up in any manner desired.

FIGS. 15 and 16 illustrate schematically alternative methods of obtaining a sine wave shaped flux pattern at each phase pole. FIG. 15 shows the two-pole faces 96 and 97 of one pair of poles encircled by single windings 98 and 99. Since the pole face areas are shaped as a sine wave, the flux pattern built up is a true sine wave rather than a stepped wave.

In FIG. 16, the pole faces 100 and 101 are divided into a plurality of protruding teeth which have windings 102 encircling them. All of the windings are connected in parallel and the windings on the teeth near the centers of the pole faces have fewer turns than those near the ends so that again a sine wave flux pattern is produced. This structure has an advantage due to the fact that, at low angles of skew, the poles in each pair overlap so that the lines of flux pass between the overlapped portions of the faces without cutting any of the rotor conductor bars. The only portions of the poles that do work are the outer extremities of the poles which do not overlap. By providing the structure shown in FIG. 16 and making the conductors in the end windings out of a heavier gauge wire, more current can flow without overheating through the end windings at low values of skew and will, therefore, increase the power obtainable.

FIG. 17 illustrates schematically a modified form of motor, according to the invention, in which a rotor 103, which may be identical to the type discussed previously is separated by a small air gap from three pair of poles 104–109. The poles are part of six rotatably mounted ring-like stator yokes of the type previously shown. Interposed between each pair of yokes is a ring-shaped winding 110–112. When current flows through the windings, the flux built up follows a path which includes, for example, the pole 104, the rotor axial laminations 113, the pole 105 and the stator axial laminations 114. The flux also travels radially in both the rotor and the stator when the poles are skewed, of course. This arrangement has the advantages that only three windings are required and long flexible lead-in conductors are not necessary since the windings are fixed in position.

The invention described herein is not limited in its application to polyphase induction motors but may be used successfully with other motors such as single split-phase induction motors, two phase motors etc., disc type rotor induction motors, spherical or linear motors, motors having a hollow rotor, etc.

In regard to the mounting of the means employed to skew the stator yokes, it is probably desirable to provide resilient mountings for the drive rollers and the gears attached to them in order to minimize noise. The stator yokes are likely to vibrate due to the fact that the torque on each yoke passes through zero 120 times a second when using a 60 cycle source. By providing a resilient mounting for the drive means for the yokes, the yokes may be allowed to vibrate virtually free through a small amplitude without undesirable effects.

In the design of the rotor, the conductor bars should preferably be made with as little resistance as possible commensurate with the low voltages which are generated at small values of skew. Also, the major portion of the resistance of the rotor should be concentrated in the end rings, the amount of which could be set by choosing a metal having the desired electrical resistivity. This is desirable because, at a low degree of skew, the magnetic fields set up by the poles will cover only a small arc around the rotor and the voltages will be induced in a relatively small number of conductor bars. Therefore, if the end rings are made of a metal having a higher resistance than the conductor bars, the currents will be confined to the bars in the magnetic fields and the motor will have better torque characteristics at low speeds.

The motor housing, end bells and spacers should all be made of a nonmagnetic metal such as aluminum, bronze, etc., and the rotor shaft should be constructed of a non-magnetic metal such as stainless steel in order to prevent the passage of magnetic flux between the separate cells.

It can be seen that the invention provides alternating current dynamo electric machinery which is capable of highly effective operation as an adjustable speed motor. By offsetting each of the pairs of poles with respect to the others around the rotor, in the case of a cylindrical induction motor, a rotating magnetic field induces currents in the rotor conductor bars and causes the rotor to rotate at a speed that is a function of the effective field rotational velocity which in turn is determined by the angular pitch between successive phases and the inductive response of the rotor conductor bars. Each pair of poles has a separate and independent magnetic flux path which can be adjusted both as to the distance between the poles in each pair and the median point between the poles of the several phases.

A principal advantage obtained is the reduction in size of the motor due to the fact that no part of the rotor or stator carries the resultant flux from all three phases. A further advantage is derived from the fact that magnetic leakage flux cannot flow between poles of opposite polarity in adjacent cells at less than full skew, even though they overlap. The passage of leakage magnetic flux has the disadvantage that it weakens the effective current in the stator windings and the torque. This novel construction also permits the use of pole faces subtending a greater portion of the rotor without leakage at full skew so that more power is provided.

In other words, the present construction permits the use of phase poles subtending a greater portion of the rotor surface and, therefore, emitting more flux per pole without the weakening effects at full skew of leakage reactance due to axially directed magnetic leakage. These and other advantages permit the construction of a variable speed alternating current motor in the same frame size and approximate overall length as a conventional squirrel cage induction motor, which is a remarkable gain in size over prior adjustable speed alternating current motors.

While particular embodiments of the present invention have been shown and described for purposes of illustration, it is apparent that changes and modifications may be made without departing from this invention in its broader aspects. Therefore, the invention described herein is not to be construed as limited to the specific embodiment described but is intended to encompass all modifications thereof coming within the scope of the following claims.

I claim:

1. In alternating current dynamo electric machinery, the combination of at least one pair of magnetic poles disposed in a row, said poles being disposed adjacent one another, electrical winding means adapted to be energized by one phase of a polyphase source and inductively coupled to the poles of said pair of poles for inducing therein magnetic fields of opposite polarities, a rotor disposed adjacent said pair of poles and spaced from said poles by a narrow air gap, a plurality of elongated conductors carried by said rotor, means extending longitudinally of said rotor forming a low reluctance, low eddy current loss, magnetic path for magnetic flux from said pair of poles, and means connected to each of said magnetic poles for moving said poles transversely of said rotor in order to vary the number of said conductors linked by the magnetic fields set up by said poles.

2. In alternating current dynamo electric machinery, the combination of a rotor, a plurality of longitudinally extending conductors carried by said rotor and insulated therefrom, means forming a low reluctance, low eddy current loss, magnetic path extending longitudinally of said rotor, at least one pair of magnetic poles disposed adjacent one another in a row extending longitudinally of said rotor, said poles having pole faces disposed adjacent said rotor and separated therefrom by a narrow air gap, winding means adapted to be energized by one phase of a polyphase source and inductively coupled to each of said poles so as to induce magnetic fields of opposite polarity therein, means forming a low reluctance, low eddy current loss, magnetic path disposed adjacent said pair of poles and extending longitudinally of said rotor, and means connected to said poles for moving said poles transversely of said rotor in order to vary the number of said conductors linked by the magnetic fields set up by said pair of poles.

3. In alternating current dynamo electric machinery, the combination as in claim 2 wherein each of said pole faces is inductively coupled to a winding, said windings being concentrically wound through teeth formed in said pole faces, respectively.

4. In alternating current dynamo electric machinery, the combination as in claim 2 wherein said pole faces are shaped in the form of a portion of a sine wave.

5. In alternating current dynamo electric machinery, the combination as in claim 4 wherein separate windings are mounted on each of said poles.

6. In alternating current dynamo electric machinery, the combination as in claim 4 wherein the poles of said pair are inductively coupled to a winding extending transversely of said rotor.

7. In alternating current dynamo electric machinery, the combination as in claim 2 wherein said pole faces have teeth formed therein and the winding means therefor comprises a plurality of windings, respectively, wound around each of said teeth, the windings for each of said pole faces being connected in parallel, said windings around the teeth at the centers of said pole faces having a fewer number of turns than said windings near the ends and said windings near the ends of said pole faces being made of a heavier gauge wire than said windings near the center of said pole faces.

8. In alternating current dynamo electric machinery, the combination of a plurality of pairs of magnetic poles disposed in a row, the poles of each pair being disposed adjacent one another, a plurality of windings inductively coupled to said respective poles, the windings for each pair of poles being adapted to be energized by the different phases of a polyphase source, respectively, such that adjacent poles in any pair have magnetic fields of opposite polarity induced therein, separate means forming a low reluctance, low eddy current loss, magnetic path disposed adjacent each of said pole pairs, a rotor disposed adjacent said poles and spaced therefrom by a narrow air gap, a plurality of elongated conductors carried by said rotor, means forming a low reluctance, low eddy current loss, magnetic path carried by said rotor adjacent to the portion of said rotor subtended by said pairs of poles and extending longitudinally of said rotor, and means connected to each of said poles for adjusting the position of each of said poles in order to vary the number of said conductors linked by the magnetic fields set up by said poles.

9. In alternating current dynamo electric machinery, the combination as in claim 8 wherein each of said poles is inductively coupled to a separate winding.

10. In alternating current dynamo electric machinery, the combination as in claim 8 wherein said windings extend transversely of said rotor and are disposed between the poles of each pair.

11. In alternating current dynamo electric machinery, the combination of a housing, a plurality of pairs of magnetic poles mounted in said housing, the poles of each pair being disposed adjacent one another, separate longitudinally extending low reluctance, magnetic paths carried by said housing adjacent each of said pairs of poles, a plurality of windings inductively coupled to the poles of each pair, the windings coupled with each pair of poles being energized by a different phase of a polyphase source such that the poles of said pair have magnetic fields of opposite polarity induced therein, a rotor mounted in said housing and spaced from said poles by a narrow air gap, a plurality of longitudinal slots formed in the periphery of said rotor, a plurality of groups of longitudinally extending low reluctance magnetic paths carried by said rotor in said slots, one of said groups of paths being disposed adjacent each of said pairs of poles, a plurality of non-magnetic spacers carried by said rotor and disposed between said groups of paths, a plurality of elongated conductors carried by said rotor in said slots, and means connected to said poles for moving said poles transversely of said rotor in order to vary the number of said conductors linked by the magnetic fields set up by said poles.

12. In alternating current dynamo electric machinery, the combination of a rotor, a plurality of longitudinally extending conductors carried by said rotor and insulated therefrom, a plurality of pairs of magnetic poles disposed in a row extending longitudinally of said rotor, the poles of each of said pairs being disposed adjacent one another, a plurality of windings inductively coupled to said pairs of poles, respectively, the windings of each pair of poles being adapted to be connected to a different phase of a polyphase source such that the poles of said pair have magnetic fields of opposite polarity induced therein, means forming a low reluctance, low eddy current loss, magnetic path for each of said pairs of poles and extending longitudinally of said rotor, and movable means connected to each of said poles for moving said poles transversely of said rotor in order to vary the number of said conductors linked by the magnetic fields set up by said poles, said moving means including a ring gear enmeshed with teeth formed in the periphery of said poles, and driving gears enmeshed with said ring gears, the number of teeth and the direction of movement of said driving gears being designed to give a predetermined program of movement of said poles.

13. In alternating current dynamo electric machinery, the combination as in claim 12 wherein there are three pairs of said poles and one pole in each pair is moved in a first direction for distances that vary according to the ratios 1:3:5 and the remainder of said poles are moved in an opposite direction for distances that vary according to the ratios 1:3:5.

14. In alternating current dynamo electric machinery, the combination as in claim 12 wherein said gears are adapted to move said poles in a manner such that the distance between the poles of each pair is varied while the position of the median point between each pair of poles is fixed.

15. In alternating current dynamo electric machinery, the combination as in claim 12 wherein said gears are adapted to move said poles in a manner such that the distance between the poles of each pair is fixed while the position of the median point between each pair of poles is varied.

16. In alternating current dynamo electric machinery, the combination of a rotor, a plurality of longitudinally extending conductors carried by said rotor and insulated therefrom, at least one pair of magnetic poles disposed in a row extending longitudinally of said rotor, the poles of each of said pairs being disposed adjacent one another, a plurality of windings inductively coupled to said pairs of poles, the windings of each pair of poles being adapted to be connected to a different phase of a three-phase source, means forming a low reluctance, low eddy current loss, magnetic path for each of said pairs of poles and extending longitudinally of said rotor, and moving means connected to each of said poles for moving said poles transversely of said rotor in order to vary the number of said conductors linked by the magnetic fields set up by said poles, said moving means including ring gears enmeshed with teeth formed in the periphery of said poles, drive gears coupled to said ring gears, and a plurality of cams adapted to move said drive gear, said cams being designed to give a predetermined program of movement of said poles.

References Cited in the file of this patent

UNITED STATES PATENTS

| 2,629,063 | Ellis | Feb. 17, 1953 |
| 2,675,494 | Ellis | Apr. 13, 1954 |

FOREIGN PATENTS

| 10,970 | Great Britain | of 1910 |